Dec. 29, 1953  K. R. DAVIES ET AL  2,664,152
FUEL SYSTEM FOR GAS TURBINE ENGINES
Filed May 11, 1948  4 Sheets-Sheet 1

INVENTORS
KENNETH R. DAVIES
KARL HERBSTRITT
BY Wilkinson & Mawhinney
ATTORNEYS

Dec. 29, 1953     K. R. DAVIES ET AL     2,664,152
FUEL SYSTEM FOR GAS TURBINE ENGINES
Filed May 11, 1948
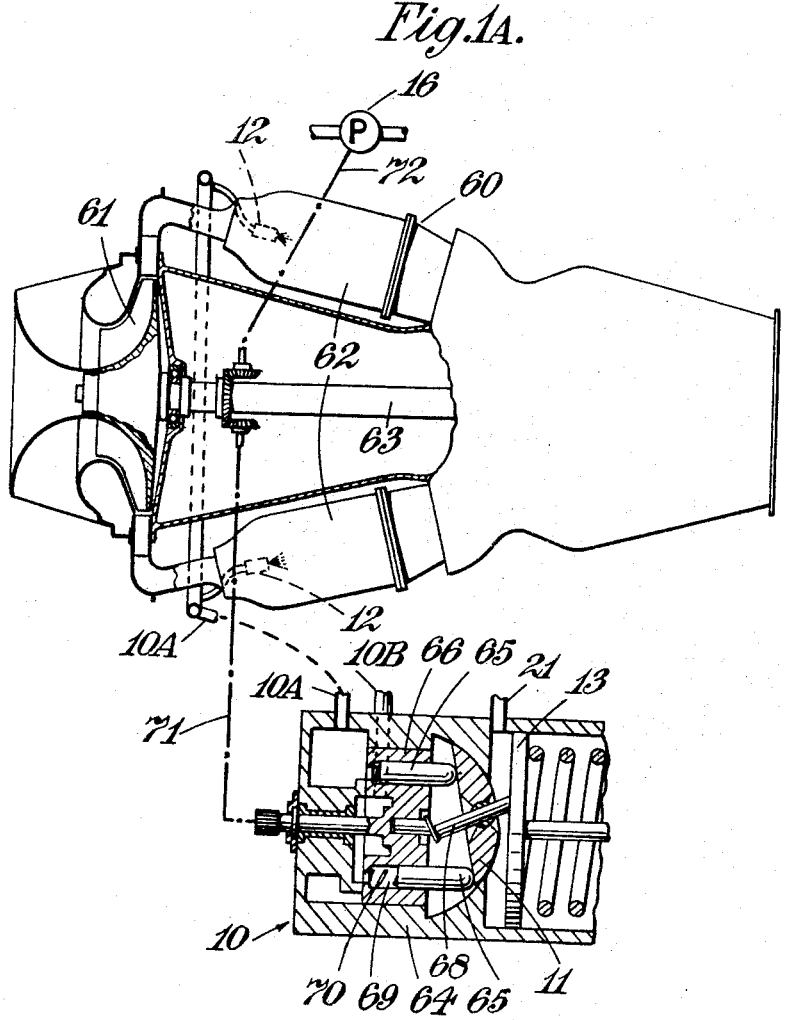
INVENTORS
K. R. DAVIES &
K. HERBSTRITT INVENTORS
KENNETH R. DAVIES
KARL HERBSTRITT
BY Wilkinson & Mawhinney
ATTORNEYS

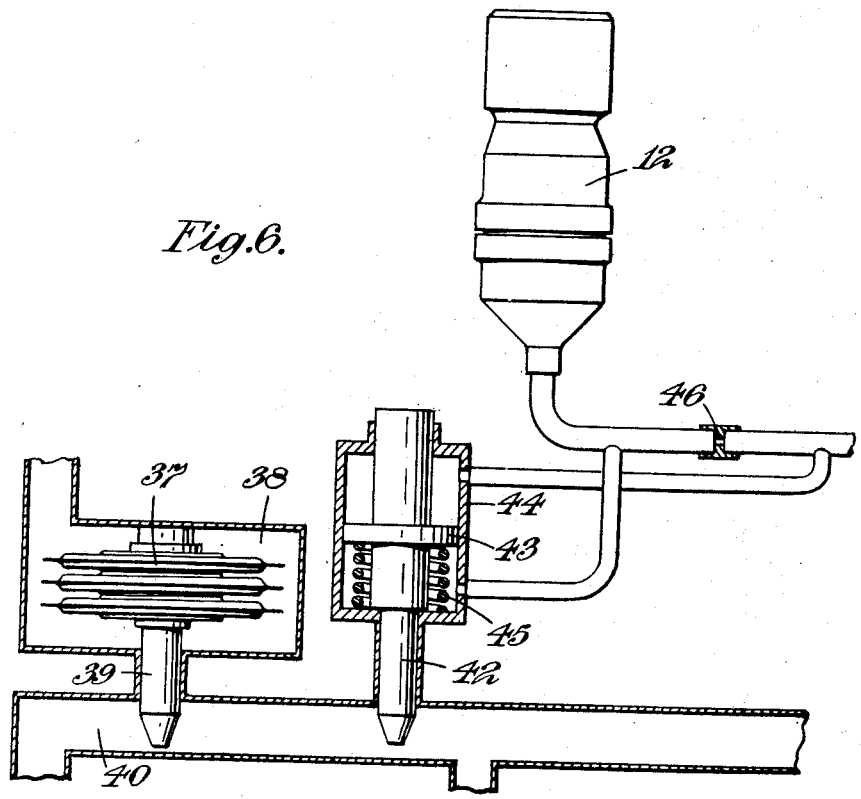
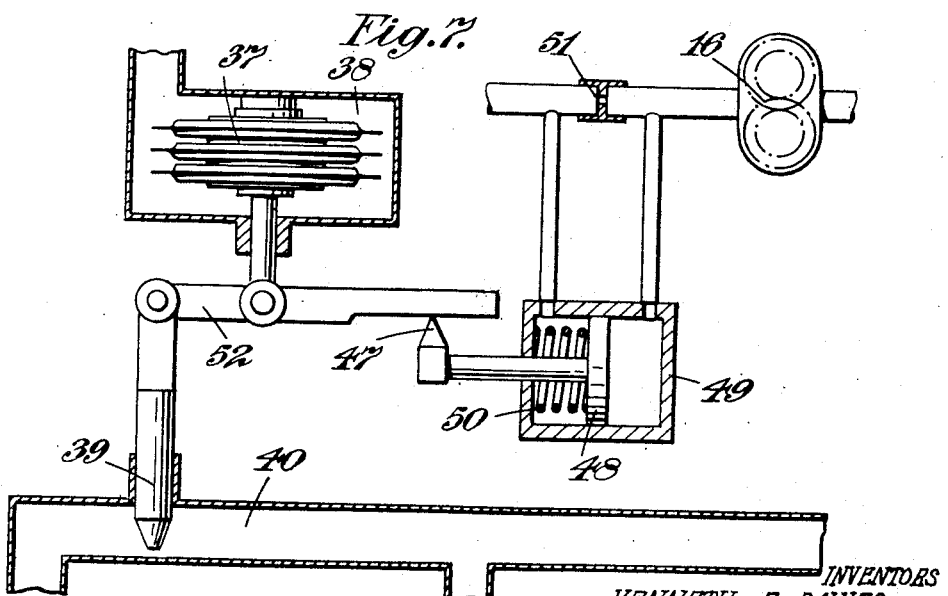

Patented Dec. 29, 1953

2,664,152

UNITED STATES PATENT OFFICE 2,664,152

FUEL SYSTEM FOR GAS TURBINE ENGINES

Kenneth Roy Davies, Radbourne, near Derby, and Karl Herbstritt, Littleover, Derby, England, assignors to Rolls-Royce Limited, Derby, England, a British company Application May 11, 1948, Serial No. 26,423

Claims priority, application Great Britain May 12, 1947

7 Claims. (Cl. 158—36.4)

This invention relates to fuel systems for gas-turbine engines. A particular application of the invention is to such engines as used for aircraft propulsion purposes, where variations of operational altitude give rise to corresponding changes in fuel consumption.

This invention has for an object to provide a fuel system (hereafter referred to as a fuel system of the kind specified) comprising control means including a constant volume hydraulic pump driven at a speed proportional to engine speed and passing liquid through restricting means which can be varied by an engine speed selecting device, and pressure responsive means normally responsive to the pressure drop across said restricting means operative to effect variation of fuel delivery to the engine to maintain the selected speed.

In such a fuel system, for any given setting of the variable restricting means there is a range of engine speed (referred to hereinafter as the "run-up" range) required to vary the fuel delivery from a maximum to a minimum. Furthermore, the fuel consumption of a gas-turbine engine decreases for a given engine speed as the operating altitude increases or the ambient pressure decreases. Thus it will be seen that with a given setting of the variable restricting means, a decrease in the ambient atmospheric pressure will result in an increase in engine speed corresponding to the difference in fuel deliveries at the original and new altitudes or ambient pressures.

The present invention has for another object to provide an improved fuel system of the kind specified in which undesirable effects arising from the run-up range with varying conditions of altitude or ambient pressure are avoided.

According to the present invention a fuel system of the kind specified for a gas-turbine engine includes means responsive to changes of altitude or ambient pressure and associated with the variable restricting means so as to vary the pressure drop in accordance with changes of ambient pressure or altitude and thereby to vary in a desired manner the fuel supply to the engine.

The provision of the ambient pressure or altitude responsive means permits undesirable effects of the run-up range of engine speed to be avoided. Thus the ambient pressure or altitude responsive means may be arranged to modify the pressure drop across the variable restricting means in a manner such that substantially uniform rotational speed of the engine is obtained for a setting of the speed selecting device, corresponding to maximum speed. Alternatively or additionally the altitude responsive device may be arranged at low-speed settings of the variable restricting means to vary the pressure drop to increase the change in engine speed with change in altitude attributable to the run-up range. This arrangement may be desirable with a control-lever setting corresponding to idling engine rotational speed to avoid the possibility of extinction of the flame in combustion equipment.

Such ambient pressure or altitude responsive means may comprise a valve or restriction arranged in series or parallel with the variable restricting means, and controlled by a barometric capsule, subjected to ambient pressure, or a function thereof which may be correlated with aircraft or engine speed. Alternatively the ambient pressure or altitude responsive means may be arranged to effect relative movement of parts defining the variable restricting means, e. g. a barometric capsule may be arranged to effect movement of a valve seat, or a valve plunger, or may be incorporated in linkage as between the speed selecting lever and the orifice restricting means.

The invention may additionally provide in combination with the means responsive to change of altitude or ambient pressure, means sensitive to the rotational speed of the engine. Such additional means sensitive to the rotational speed of the engine may comprise a pressure sensitive device subjected to pressure drop across a fixed orifice through which the hydraulic pump driven at a speed proportional to engine speed passes liquid, whereby such pressure drop is a function of the engine speed. Alternatively the fixed orifice may pass the actual fuel delivery to the engine, whereby the pressure drop is a function of engine speed and altitude.

To obtain stability of control, it is preferred to arrange the control means to have a run-up range which may for example amount to 5 to 20% of the selected speed. In this manner it becomes desirable to include means in accordance with the invention to compensate for or to accentuate (if desired) variation between actual and selected speed, which are attributable to the run-up range and variation of altitude or ambient pressure.

The following describes by way of example of this invention, control means suitable for a gas-turbine engine fuel system.

The description refers to the accompanying diagrammatic drawings in which

Figure 1A illustrates a typical gas-turbine engine and variable delivery fuel pump for delivering fuel to the engine.

Figures 6 and 7 illustrate modifications of the control means.

Figure 1:
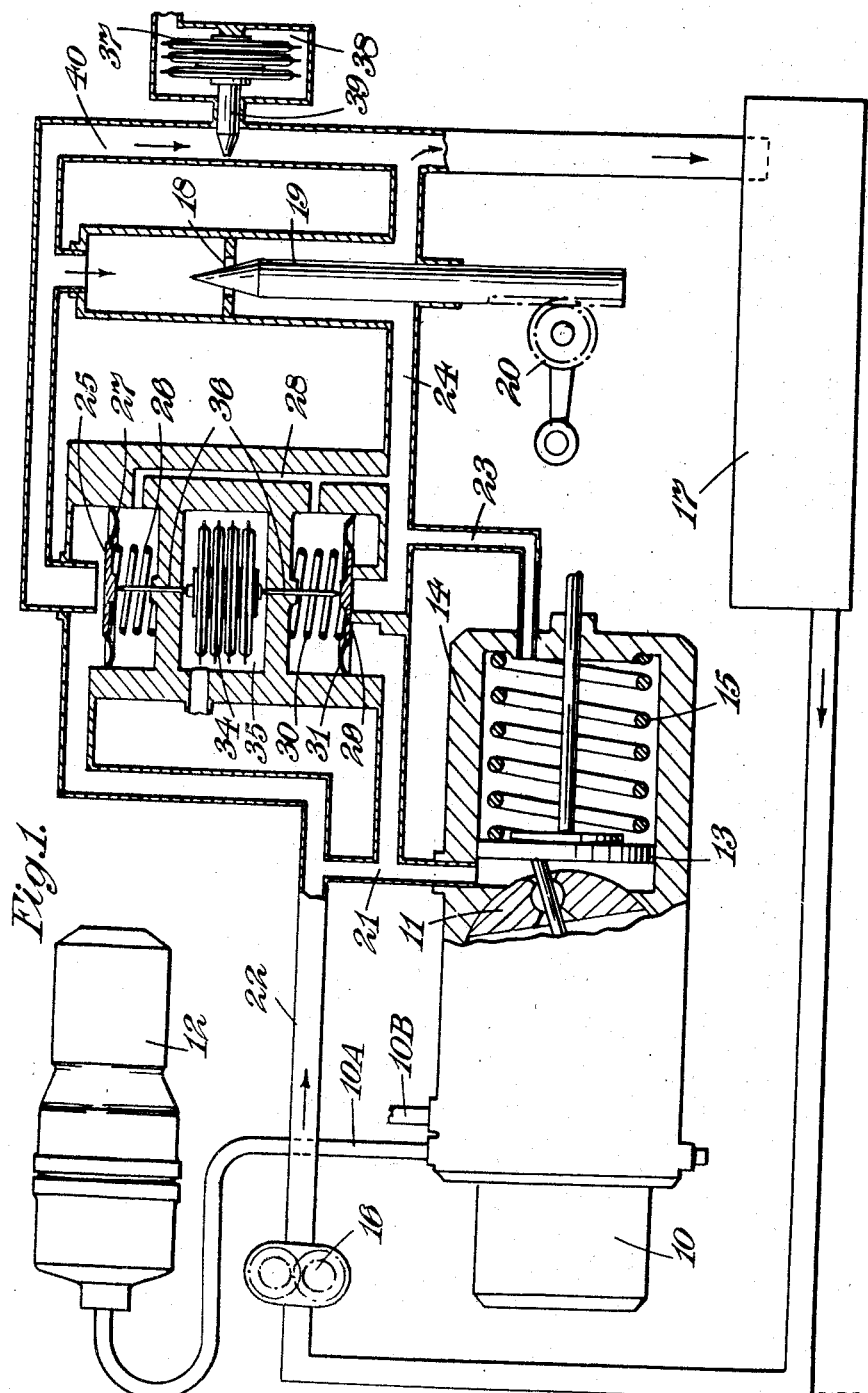
Figure 1 illustrates the control means and a part of the fuel system.

Referring to Figure 1A there is illustrated a typical gas-turbine engine 60 and a variable delivery fuel pump 10 for delivering fuel to the engine.

The gas-turbine engine comprises a compressor 61 which delivers compressed air into a series of combustion chambers 62 which are disposed in a ring around the engine and of which two only are shown, a fuel delivery manifold connected with fuel injection devices 12 for delivering fuel into the combustion chambers 62 wherein the fuel is burnt, a turbine (not shown) which receives the combustion products from the combustion chambers 62 and drives a shaft 63 carrying the compressor rotor.

The fuel is delivered to the fuel injection devices 12 by the variable delivery fuel pump 10 through a delivery pipe 10A, the pump being driven from the shaft 63 through a drive indicated at 71.

The fuel pump 10 as illustrated comprises a body 64, a rotor 66 accommodated within the pump body 64, a plurality of plungers 65 which reciprocate in bores 69 in the rotor 66 against the action of springs 70 and means to adjust the stroke of the pump plungers 65 to vary the delivery of the pump. The means to vary the delivery of the pump in the construction of pump illustrated comprises a swash plate 11 carried on the crank portion of a spindle 68 which is axially movable with respect to the pump rotor 66. As the spindle 68 is adjusted axially of the rotor the inclination of the cam face of the swash plate 11 with respect to the rotor axis varies thus altering the stroke of the pump plungers. In operation, on rotation of the rotor 66 through the drive 71 fuel is drawn in to the pump bores through a suction pipe 10B by the pump plungers 65 riding up the cam face of the swash plate 11 under the control of springs 70 and subsequently the fuel is delivered into the fuel delivery pipe 10A by the plungers riding down the cam face of the swash plate 11 against the action of the springs 70.

The means illustrated to control the delivery of fuel to the engine by varying the angle of inclination of the cam face of the swash plate 11 is in part the subject of our co-pending U. S. application Serial No. 26,424, filed May 11, 1948, now Patent No. 2,618,222 issued November 18, 1952.

In the arrangement of Figure 1, the angle of inclination of the fuel pump swash plate 11 is varied by means of a piston and cylinder device whereof the piston 13 is slidable in the cylinder 14 against the action of a spring 15, it being arranged that as the spring 15 is compressed the pump stroke decreases.

Hydraulic control means is provided to displace the piston 13.

The control means comprises a constant displacement pump 16, for instance a gear pump, arranged to be driven at a speed proportional to the engine speed through a drive indicated at 72 (Figure 1A) and drawing liquid from a reservoir 17 and delivering it through an orifice 18 back to the reservoir. The effective area of the orifice 18 is controlled by a needle valve 19, the position of which is determined by a manually-operated lever 20 connected to the pilot's speed selecting lever.

A branch 21 is taken from the pump delivery pipe-line 22 to the cylinder 14 so that the delivery pressure of the pump is applied to the piston 13 to oppose the spring 15, and a branch 23 is taken from a pipe line 24 downstream of the orifice 18 to the opposite end of the cylinder 14.

The position of the piston 13 in the cylinder 14 is thus determined by the pressure drop across the orifice 18 and is thus a function of the engine speed and of the effective area of the orifice. Furthermore, an increase in the pressure drop causes a decrease in the stroke of the fuel pump 10 so that the needle valve 19 is arranged to increase the effective area of the orifice to increase the engine speed.

With the control arrangement above described, rapid opening or closing movement of the control lever would produce a substantally instantaneous decrease or increase in the pressure drop applied to piston 13, and this in certain circumstances will give undesirable characteristics to the fuel delivery of the pump 10. For instance, if the engine is running at low speed and the control lever is moved rapidly to the full throttle position, the pump 10 would be substantially instantaneously moved to full-stroke with the result that over-fuelling of the engine may occur.

Over-fuelling can give rise to excessive temperature in the engine combustion equipment and turbine, and possibly also to surge in the air compressor of the engine or to extinction of the flame. Again, if the control lever 20 is closed rapidly a rapid increase occurs in the pressure drop, applied to piston 13 with a correspondingly rapid decrease in the fuel-pump stroke to its minimum stroke. This can result in extinction of the flame in the combustion equipment.

These disadvantages are overcome by providing means to limit the maximum and minimum pressure drop that can occur across the orifice 18. The pressure drop limiting means comprises a lift valve 25 which is loaded by a spring 26 and is arranged in the pipe-line 22 between the point of connection of the branch 21 and the orifice 18. The valve element 25 is conveniently carried by a diaphragm 27 to isolate one side of the valve from the other. As will be seen, one side of the valve 25 is subjected to the delivery pressure of pump 16 and the other side is in communication through a duct 28 with the downstream side of the orifice 18.

The valve 25 will open when a predetermined pressure drop is reached across orifice 18 and ensures that the pressure applied to the piston 13 has a selected minimum value depending on the rate of the spring 26. This ensures that the stroke of the pump 10 cannot increase above a selected value and that over-fuelling is avoided.

The spring 26 is preferably selected to have a rate such that the predetermined pressure drop at which the valve 25 opens is substantially unaffected by the rate of flow of liquid in the control circuit, so that the valve does not introduce a variable pressure drop when liquid is flowing through it.

A second lift valve 29 is provided to limit the maximum pressure drop. This valve is loaded by a spring 30 and is carried by a diaphragm 31. The valve 29 is connected hydraulically in parallel with the valve 25 and the orifice 18 to control the flow through a pipe-line 32. This valve is loaded on one side by the delivery pressure of pump 16 and its other side is in communication through duct 28 with the downstream side of the orifice 18. The valve is therefore in the nature of a relief valve and opens when a preselected pressure drop is reached across orifice 18 thereby limiting the extent to which the stroke of pump 10 can be decreased. In this way under-fuelling of the engine is avoided.

It is also arranged that the maximum and minimum pressure drops that can be applied to the piston 13 are varied with variations in the altitude at which the engine is operating. For this purpose means responsive to the ambient atmospheric pressure is provided to vary the load on the valves 25, 29. This means in the arrangement illustrated comprises an evacuated capsule 34 located between the valves 25, 29 which are arranged to open in opposite directions, in a chamber 35 which is open to atmosphere or communicates with the engine compressor air intake. The capsule 34 is arranged to load the valves through push-rods 36. Clearly on increase of altitude, the capsule expands and increases the load on the valves, and on decrease of altitude the valve loading is decreased. In the result, the maximum and minimum stroke settings of the fuel-pump 10 are less at altitude than those at ground level.

The capsule 34 can be, if desired, replaced by two capsules one for each of the valves 25, 29.

The capsule or capsules will be selected to have a rate giving the desired valve-load/altitude characteristics in accordance with the engine fuel requirements with change of altitude.

Figure 2:
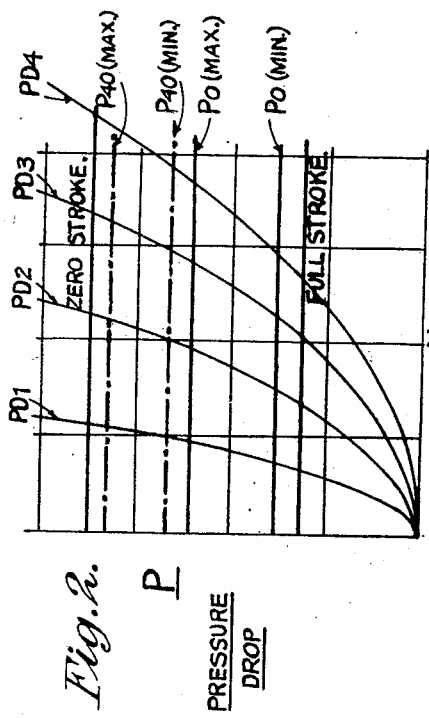
Figure 3:
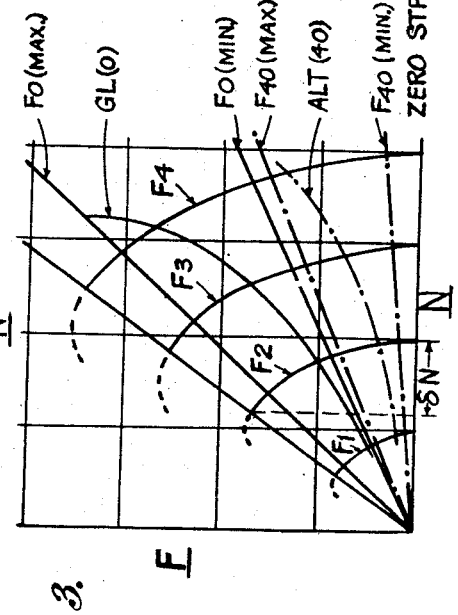

The operation of the control above described is illustrated in the graphs of Figures 2 and 3. Referring to Figure 2, there is shown curves giving the pressure drop applied to the piston 13 plotted against engine speed N. The pressure drop curves $PD_1$, $PD_2$, $PD_3$, $PD_4$ correspond to different settings of orifice 18, $PD_1$ corresponding to the idling speed selection by lever 20, $PD_4$ to maximum speed, $PD_2$ and $PD_3$ to intermediate settings. The line "Full Stroke" indicates the minimum pressure required just to displace the piston 13 from the full-stroke setting of the fuel pump and the line "Zero Stroke" indicates the pressure drop required to move the piston 13 fully to the minimum stroke setting of the fuel pump.

The effect of valve 25 and capsule 34 is illustrated by lines $P_{0(Min)}$ and $P_{40(Min)}$ showing that at ground level (indicated by suffix 0) the minimum pressure that can be applied to the valve piston 13 is given by the line $P_{0(Min)}$ and at altitude (say 40,000 feet, indicated by suffix 40) by the line $P_{40(Min)}$. Thus the maximum permissible stroke of the pump 10 due to the governor at altitude is less than that at ground level, and that both are less than the maximum possible stroke of the pump, thereby avoiding over-fuelling.

The corresponding curves for valve 29 and capsule 34 are the lines $P_{0(Max)}$ and $P_{40(Max)}$ showing that the minimum permissible stroke of pump 10 is less at altitude than at ground level, and that both are greater than the minimum possible stroke thereby avoiding underfuelling.

The corresponding fuel delivery engine speed curves are given in Figure 3. In this graph, the line "Full Stroke" indicates the maximum possible fuel delivery and the line "Zero Stroke" the minimum possible fuel delivery, $F_{0(Max)}$ and $F_{0(Min)}$ the maximum and minimum permitted fuel deliveries at ground level due to the control of valves 25, 29, and $F_{40(Max)}$ and $F_{40(Min)}$ the maximum and minimum permitted fuel deliveries at high altitude (say 40,000 feet) due to the control of valves 25, 29 and capsule 34. The engine fuel requirement curves at ground level is the line $GL(0)$ and that at the specified altitude is the line $ALT(40)$. It will be clear that the rates of springs 26, 30 and capsule 34 will be selected so that the lines $F_{0(Max)}$, $F_{0(Min)}$ and $F_{40(Max)}$, $F_{40(Min)}$ will lie one on each side of the curves $GL(0)$ and $ALT(40)$ respectively.

Curves $F_1$, $F_2$, $F_3$, $F_4$ are fuel delivery curves at different orifice settings and the engine speed will be stabilised for a given orifice setting at a speed corresponding to the point of intersection of the fuel-delivery curve appropriate to the orifice setting and the appropriate altitude consumption curve.

The present invention provides means for varying the fuel delivery in accordance with changes in ambient atmospheric pressure and also if desired for varying the effect of the ambient pressure control in accordance with the engine rotational speed or the fuel delivery to the engine.

In applying the invention to the control as above described means responsive to changes of ambient atmospheric pressure is associated with the valve control orifice 18 to vary the pressure drop across the orifice 18 for any given setting thereof so that the fuel delivery of the pump 10 is varied in accordance with ambient atmospheric pressure. This barometric pressure responsive means comprises evacuated capsule 37 located and anchored at one end to a chamber 38 open to atmosphere or to the engine compressor air intake. The capsule is arranged by its expansion and contraction under variations in the ambient pressure to operate a valve 39 controlling the flow of liquid through a by-pass 40 around the orifice 18 from the upstream side to the downstream side thereof so that the pressure drop applied to the piston 13 increases with altitude. The restriction afforded by the capsule-controlled valve 39 can be arranged so that for any desired setting of the control lever, the speed of the engine is independent of altitude.

Figure 4:
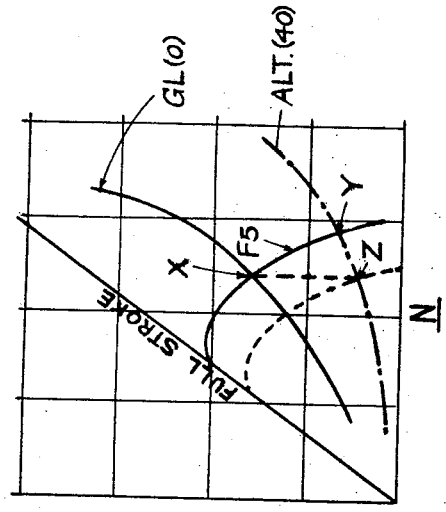
Figures 2 to 5 illustrate graphically the action of the control means.

The operation of the device will be clear from a consideration of Figure 4. $F_5$ is the fuel-delivery curve for a selected setting of orifice 18 and $GL(0)$ and $ALT(40)$ are the engine requirement curves at ground level and at altitude (e. g. 40,000 ft.). In the absence of the barometric control, for the selected orifice setting the engine speed would stabilize at a speed corresponding to the point X, i. e. the point of intersection of the curves $F_5$ and $GL(0)$ and if now the aircraft climbs to an altitude corresponding to curve $ALT(40)$, the engine speed will increase and stabilize at a speed corresponding to point Y. The barometric control however ensures that the speed remains unaltered by displacing the curve $F_5$ to the left so that at each altitude the curve $F_5$ intersects the appropriate consumption curve on the line XZ which represents a constant engine speed.

In certain cases it may be desired to cause the capsule to have a greater or less effect at different engine speeds, so that, for instance, at low engine speeds, e. g. at idling speeds, for a given setting of the orifice 18 the engine speed increases with altitude, while at higher engine speeds the engine speed does not change with altitude for a given orifice setting.

Figure 5:
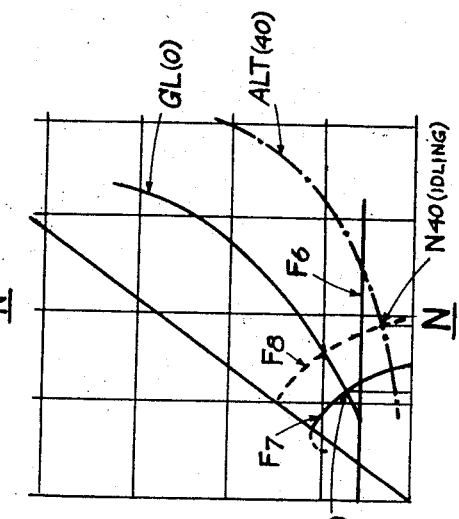

For this purpose an arrangement as illustrated in Figure 6 may be employed. In this arrangement the bypass 40 includes a second needle valve 42 which is controlled by a piston 43 working in a cylinder 44 against a spring 45. The piston is controlled by the pressure drop across a restriction orifice 46 in the fuel pipeline to the injection devices 12 and the spring strength is selected so that at fuel flows above that represented by the line $F_6$ (Figure 5) the spring is fully compressed and the valve 42 acts as a fixed restriction. When the fuel flow decreases to a value below that represented by the line $F_6$ the valve 42 opens reducing the effective restriction by the orifice 18 thereby giving an increased fuel flow for the orifice setting.

Thus, when the orifice is set, for example, for idling, the engine speed at ground level will be given by the point $N_0$ (idling) and at altitude by the point $N_{40}$ (idling) obtained by displacing the curve $F_7$ to the right to a position $F_8$, which is equivalent to increasing the effective area of orifice 18.

Another arrangement for the same purpose is illustrated in Figure 7. In this arrangement, the capsule 37 is connected to needle valve 39 through a lever 52 which has a variable fulcrum 47. The position of the fulcrum 47 is determined by a piston 48 working in a cylinder 49 against a spring 50. The piston 48 is displaced by the pressure drop across a fixed orifice 51 which is preferably located immediately downstream of the governor pump 16. The position of the piston 48 is thus dependent on the speed of the engine.

In operation, as the engine speed is increased the piston will travel to the left thereby moving the fulcrum 47 to increase the effect of the capsule 37 on the needle valve 39. Thus at low speeds, the capsule will have less effect on the setting of the needle valve 39 than at high engine speeds, so that the altitude correction due to the constriction afforded by valve 39 in conduit 40 at low speeds is less than that at high speeds and a rise of engine speed with low speed settings of the orifice 18 is obtained on increase of altitude.

Although in the embodiment illustrated the variable orifice comprises a simple tapered needle, it may be desirable to use variable restricting means as described in our co-pending British patent application No. 12,822/47, now British Patent No. 639,262, issued June 28, 1950. In the specification accompanying this application we have described variable restricting means comprising a combination of a variably loaded valve hydraulically in series with a restricting orifice, the load on the valve and the effective area of the orifice being simultaneously varied by the power setting device in such a manner as to define run-up ranges appropriate for the various running conditions of the engine.

We claim:

1. In a gas-turbine engine fuel-system including adjusting means to vary the delivery of fuel to the engine, control means to actuate the adjusting means comprising a constant displacement hydraulic pump adapted to be driven at a speed proportional to engine speed; a first conduit connected to said hydraulic pump to receive the full delivery of said hydraulic pump, a first flow-restricting orifice located in the first conduit, a valve member co-operating with said orifice, a manually-operable speed-selecting member adapted to adjust said valve member with respect to the first orifice whereby the area of said first orifice is controlled solely by said manually-operable speed-selecting member, a second conduit connected with said first conduit at points upstream and downstream of said first orifice, a second valve member projecting into said second conduit to restrict the flow therethrough, a lever for varying the extent to which said second valve member restricts the flow through said second conduit, a fulcrum for said lever, a capsule arranged to be responsive to changes in ambient atmospheric pressure and connected with said lever to rock the lever about its fulcrum in a manner to increase the restriction afforded by said second valve member on decrease of the ambient atmospheric pressure, a fixed area orifice connected in said first conduit upstream of the points of connection of said second conduit with said first conduit, a piston and cylinder device whereof the cylinder is connected at its ends to said first conduit at points upstream and downstream of the fixed area orifice respectively, a spring loading said piston on the side thereof connected with the first said conduit downstream of the fixed area orifice, said piston being connected with the fulcrum so that the fulcrum moves with the piston and that on increase of engine speed the fulcrum is moved to increase the effect of the capsule on the second valve member; and a pressure-responsive device having pressure connections to said first conduit upstream and downstream of said first flow-restricting orifice thereby to respond to the total pressure drop across said flow-restricting means and connected to said adjusting means to actuate it.

2. In a gas-turbine engine fuel-system including adjusting means to vary the delivery of fuel to the engine, control means to actuate the adjusting means comprising a constant displacement hydraulic pump adapted to be driven at a speed proportional to engine speed; flow-restricting means connected to said hydraulic pump to receive the full delivery of said hydraulic pump and comprising a first conduit, a first orifice in said conduit, a valve member co-operating with said orifice, a manually-operable engine-speed-selecting device to adjust said valve member with respect to said first orifice to vary the area of the said orifice, a second conduit connected with said first conduit at points upstream and downstream of said first orifice, a second valve member arranged to restrict the flow through said second conduit, a capsule arranged to be responsive to ambient atmospheric pressure and connected with said second valve member to adjust it in a sense to increase the restriction afforded by it with decrease of ambient atmospheric pressure, a third valve member arranged to afford a restriction in said second conduit and means responsive to the actual fuel flow to the engine to adjust said third valve member to decrease the restriction afforded by it with decrease of fuel flow; and a pressure-responsive device hydraulically connected to respond to the total pressure drop across said flow-restricting means and arranged by its response to changes in the pressure drop to actuate said adjusting means.

3. In a gas-turbine engine fuel system including adjusting means to vary the delivery of fuel to the engine, control means to actuate the adjusting means comprising a constant-displacement hydraulic pump adapted to be driven at a speed proportional to engine speed; a manually-operable speed-selecting lever; conduit means connected to said hydraulic pump to receive the full delivery of said hydraulic pump and flow-restricting means located in said conduit means and comprising a first variable-area orifice the area of which is adapted to be controlled solely by said manually-operable speed-selecting lever, and a second variable-area orifice; pressure-responsive means adapted to be responsive to changes in ambient atmospheric pressure and connected to vary the effective area of said second variable-area orifice in a manner to decrease the area on decrease of ambient atmospheric pressure, and a pressure-responsive device having pressure connections to said conduit upstream and downstream of said flow-restricting means, thereby to respond to the total pressure drop across said flow-restricting means, and connected to said adjusting means to actuate it.

4. In a gas-turbine engine fuel system including adjusting means to vary the delivery of fuel to the engine, control means to actuate the adjusting means comprising a constant-displacement hydraulic pump adapted to be driven at a speed proportional to engine speed, a manually-operable speed-selecting lever; a first conduit connected to said hydraulic pump to receive the full delivery of said hydraulic pump, a first variable-area orifice located in said conduit means and adapted to have its area controlled solely by speed-selecting movements of said manually-operable speed-selecting lever, a second conduit connected by its ends to said first conduit on each side of said first variable-area orifice, and a second variable-area orifice located in said second conduit; pressure-responsive means adapted to be responsive to changes in ambient atmospheric pressure and connected to vary the effective area of said second variable-area orifice in a manner to decrease the area on decrease of ambient atmospheric pressure; and a pressure-responsive device having pressure connections to said conduits upstream and downstream of said flow-restricting orifices, thereby to respond to the total pressure drop across said flow-restricting orifices, and connected to said adjusting means to actuate it.

5. In a gas-turbine engine fuel system including adjusting means to vary the delivery of fuel to the engine, control means to actuate the adjusting means comprising a constant-displacement hydraulic pump adapted to be driven at a speed proportional to engine speed; a manually-operable speed-selecting lever; conduit means connected to said hydraulic pump to receive the full delivery of said hydraulic pump and flow-restricting means located in said conduit means and comprising a first variable-area orifice the area of which is adapted to be controlled solely by said manually-operable speed-selecting lever, and a second variable-area orifice connected in said conduit means hydraulically in series with said first variable-area orifice; pressure-responsive means adapted to be responsive to changes in ambient atmospheric pressure and connected to vary the effective area of said second variable-area orifice in a manner to decrease the area on decrease of ambient atmospheric pressure; and a pressure-responsive device having pressure connections to said conduit upstream and downstream of said flow-restricting means, thereby to respond to the total pressure drop across said flow-restricting means, and connected to said adjusting means to actuate it.

6. In a gas-turbine engine fuel system including adjusting means to vary the delivery of fuel to the engine, control means to actuate the adjusting means comprising a constant-displacement hydraulic pump adapted to be driven at a speed proportional to engine speed, a manually-operable speed-selecting lever; a conduit connected to said hydraulic pump to receive the full delivery of said hydraulic pump, a first variable-area orifice located in said conduit, the area of said first variable-area orifice being adapted to be controlled solely by said manually-operable speed-selecting lever, a valve member arranged to afford a restriction to flow through said conduit, a barometric capsule adapted to be responsive to ambient atmospheric pressure, a lever linking said valve member and said capsule, an adjustable fulcrum for said lever arranged so that on decrease of the ambient atmospheric pressure the restriction afforded by said valve member is increased, and means adapted to be responsive to engine speed to adjust the position of said adjustable fulcrum to increase the effect of said capsule on the valve member on increase of engine speed; and a pressure-responsive device having pressure connections to said conduit upstream and downstream of said flow-restricting orifices, thereby to respond to the total pressure drop across said flow-restricting orifices, and connected to said adjusting means to actuate it.

7. Control means according to claim 6, wherein said means responsive to engine speed comprises a fixed area flow-restricting means connected to receive the full delivery of said hydraulic pump, and a spring-loaded piston connected to be loaded differentially by the pressures upstream and downstream of said fixed area flow-restricting means thereby to be displaced by variations in the engine speed, and wherein the lever fulcrum is connected to the piston to be displaced thereby.

KENNETH ROY DAVIES.
KARL HERBSTRITT.

References Cited in the file of this patent

UNITED STATES PATENTS

| Number | Name | Date |
|---|---|---|
| 1,381,512 | Smith | June 14, 1921 |
| 2,219,994 | Jung | Oct. 29, 1940 |
| 2,384,282 | Chandler | Sept. 4, 1945 |
| 2,405,888 | Holley | Aug. 13, 1946 |
| 2,445,113 | Green et al. | July 13, 1948 |
| 2,457,595 | Orr | Dec. 28, 1948 |
| 2,481,334 | Nicolls | Sept. 6, 1949 |
| 2,514,674 | Schorn | July 11, 1950 |
| 2,545,703 | Orr | Mar. 20, 1951 |